Jan. 6, 1925.

G. H. WADE 1,522,399

SHADE AND REFLECTOR FOR MOTOR VEHICLE HEADLIGHTS

Filed June 7, 1924

Inventor
George Hamilton Wade,
By H. L. Woodward
Attorney

Patented Jan. 6, 1925.

1,522,399

UNITED STATES PATENT OFFICE.

GEORGE HAMILTON WADE, OF CATONSVILLE, MARYLAND.

SHADE AND REFLECTOR FOR MOTOR VEHICLE HEADLIGHTS.

Application filed June 7, 1924. Serial No. 718,587.

*To all whom it may concern:*

Be it known that GEORGE HAMILTON WADE, a citizen of the United States, residing at Catonsville, in the county of Baltimore and State of Maryland, has invented certain new and useful improvements in Shades and Reflectors for Motor-Vehicle Headlights, of which the following is a specification.

The invention has for an object to provide a device attachable to the headlights of automobiles without disturbing the ordinary lenses mounted therein; which will positively cut off light from the headlights tending to be projected laterally in an objectionable manner, and which will also shield the headlights from entry of rays from the headlights of approaching vehicles, for such advantage as may reside therein.

It is a particular aim of the invention to provide a novel means for attaching such a device to headlights, and especially in one form to provide an arrangement whereby the device without disturbing its mounting, may be moved into an inoperative position. It is a further important aim of the invention to provide such a device which may be used on ordinary headlights without change of structure in the body of the lamp casing or lenses. It is a further very important purpose to present the appliance in such form that in a single embodiment it may be applied to headlights of various different constructions.

Additional objects, advantages and features of invention reside in the construction, arrangement and combination of parts, as may be more readily understood from the following description and accompanying drawings, wherein—

Figure 1:
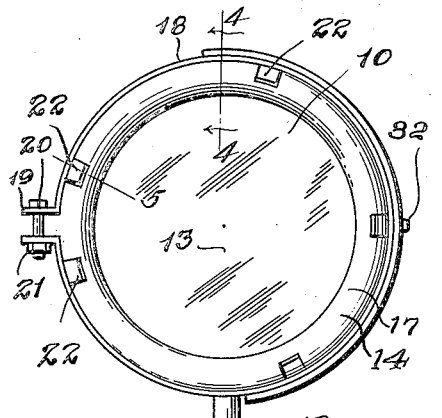
Figure 1 is a front elevational view of a headlight equipped with my invention.
Figure 2:
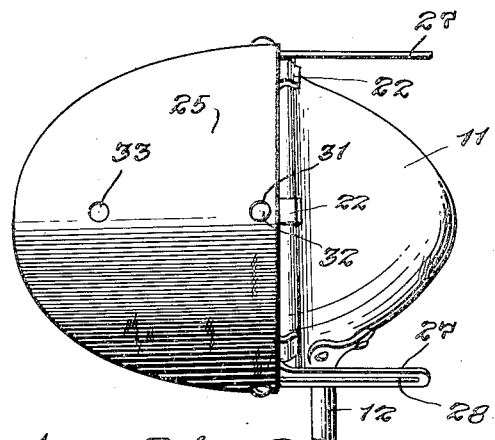
Figure 2 is a left hand view thereof.
Figure 4:
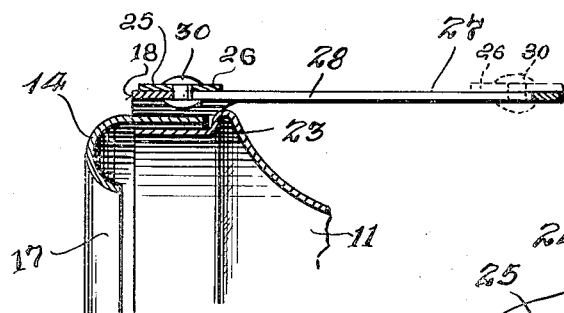
Figure 4 is a fragmentary sectional view on the line 4—4 of Figure 1.
Figure 3:
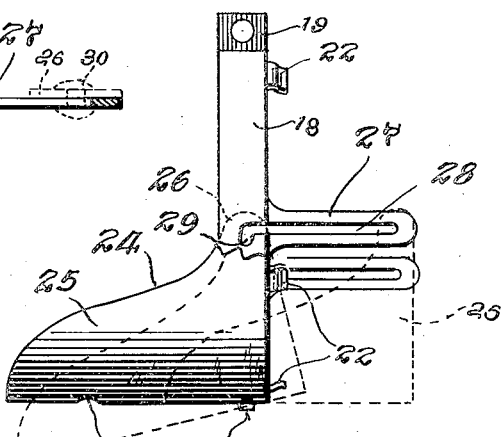
Figure 3 is a top view of the device.
Figure 5:
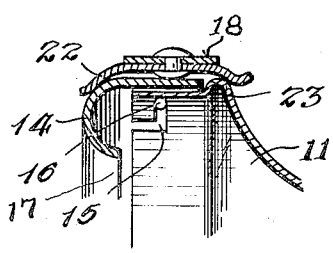
Figure 5 is a similar view on the line 5 of Figure 1.

There is illustrated a headlight 10 of a familiar form, including a parabolic lamp case 11, mounted upon a bracket 12. The casing 11 has a lens 13 removably secured in the forward part thereof by means of a removable collar 14 slipped over the forward part of the case, as shown in Figures 4 and 5. Its fastening may comprise any usual means employed on such devices, a bayonet slot 15 being shown in the case in the present instance, in which a pin 16 carried by the collar 14 may be engaged, as will be readily understood. The collar 14 is provided with an inturned flange 17, projected inwardly so as to engage the front face of the lens 13, whereby the latter is retained in place.

In Figures 1 to 5 a clamp ring 18 is shown, consisting of a strap of resilient metal, having its ends turned outwardly to form ears 19 through which a bolt 20 is engaged, a nut 21 being engaged on the bolt to draw the ears together. At intervals upon the inner side of the ring 18 there are riveted bow springs 22, extending slightly beyond the edges of the ring, and adapted to bear resiliently upon the forward parts of the collar 14, and the flared part 23 of the case 11, just inward of the collar 14.

Upon the ring 18 there is secured a reflector and shade 25, having substantially the shape of a scoop, being in the form of a segment of a cylinder with a rearward edge in a plane at right angles to the axis of curvature. Ears 26 are formed at the top and bottom of the shade at the rear part.

While the shade 25 may be fixed upon the ring 18, I prefer to have the shade adjustable for movement to an inoperative position at times, and for this purpose the ring 18 is provided with rearward longitudinally slotted extensions 27, the slots 28 of which have at their forward ends short lateral parts 29 extended toward the side of the headlight at which the shade 25 is positioned. In the ears 26 there are provided headed pins 30, slidable in the slots 28. Centrally of the shade 25 adjacent the rear edge an aperture 31 is formed, and the ring 18 carries a stud 32 which may be sprung into the opening 31 by forward movement of the shade, or may be disengaged by springing the central part of the shade outwardly, as will be explained. The stud 32 may be the head of a rivet holding one of the springs, if desired. A second hole 33 of the same diameter as the one 31 and alined horizontally therewith is formed in the forward part of the shade 25, and is similarly adapted to receive the stud 32 snugly when the shade is at the rearward limit of its movement, as dotted in Figure 3. In case the bracket 12 of the headlight is located in line with the axis of the headlight, it will be necessary to locate the lower extension 27 of the ring 18 a little off center, as may be understood from Figure 3.

Figure 6:
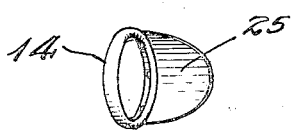
Figure 6 is a perspective view of a further simple embodiment of the invention.

It may also be found preferable in some forms of the device in special types of headlights to mount the shade 25 directly upon the ring 14, as shown in Figure 6, the shade 25 being removable with the ring.

In the use of the device of Figures 1 to 5, it should be understood that the aperture 33 is located at a distance from the pins 30 slightly greater than the corresponding distance between the rear ends of the slots 28 and the stud 32, so that when the pins 30 are at the rear ends of the slots a slight springing of parts is required to engage the stud 32 in the aperture 33, whereby it will be held against loose movement and against casual disengagement until required. For movement to forward position, it is only necessary to press the shade 25 outwardly from the stud 32 manually, and then draw the case bodily forward to the dotted position indicated at the left in Figure 3, which will admit the pins 30 into the lateral parts 29 in the slot readily, after which the shade is moved pivotally to the position shown in full lines in Figure 3, by which means the studs 32 will be forced into the rear aperture 31 of the shade. For disengagement of the shade from this position, and return to inoperative position, it is only necessary to press upon the forward edge of the shade at its middle part, until its moves to the position dotted at the left in Figure 3. The pressure indicated will cause a flexure of the shade itself until its middle part springs over the stud. It may then be moved back until the pins 30 engage the rear ends of the slots 28, after which lateral inward pressure on the front of the shade will cause the stud 32 to engage the hole 23.

It will be seen that a very simple construction of the character indicated is provided, adapted to be produced at a low cost and installed upon various forms of headlights with a minimum of difficulty, and that the device is of a serviceable character.

I claim:

1. A device of the character described comprising a mounting element to be removably secured upon a headlight embracing the outer part thereof and having rearward longitudinally slotted extensions, the slots extending into the forward parts of the mounting and having lateral parts extending in one direction, a shield reflector device transversely curved and having pins at opposite sides adjacent the rear part slidable in said slots, the medial part of the shield reflector being proportioned to engage the mounting to draw said pins into the lateral parts of the slots when the shield reflector is in operative position.

2. The article of claim 1 in which the shield is apertured at its rear part, and a stud provided on the mounting, to engage the aperture to secure the shield reflector in operative position releasably.

3. The article of claim 1 in which an aperture is provided in the forward part of the shield reflector centrally located and a stud is provided on the mounting spaced from the rear parts of the slots a distance corresponding to the distance between said aperture and the pins slidable in the slots first named, for the purposes described.

In testimony whereof I affix my signature.

GEORGE HAMILTON WADE.